United States Patent Office 3,637,803
Patented Jan. 25, 1972

3,637,803
ALKYL METHYLSULFONYLALKYL BENZOATES
Tsung-Ying Shen and Clifford H. Shunk, Westfield, N.J., assignors to Merck & Co., Inc., Rahway, N.J.
No Drawing. Application Aug. 1, 1966, Ser. No. 569,039, which is a continuation-in-part of application Ser. No. 458,435, May 24, 1965. Divided and this application May 22, 1969, Ser. No. 827,494
Int. Cl. C07c 147/06
U.S. Cl. 260—470       1 Claim

ABSTRACT OF THE DISCLOSURE

Benzyl methyl sulfones having anti-inflammatory, antipyretic and analgesic activity and processes for their preparation. Also included are pharmaceutical compositions containing said benzyl methyl sulfones and methods of treating inflammation by administering these particular compositions to patients.

---

This application is a division of application Ser. No. 569,039, filed Aug. 1, 1966 which is a continuation-in-part of our application Ser. No. 458,435, filed May 24, 1965 now abandoned.

This invention relates to a method of treating inflammation utilizing novel anti-inflammatory compositions containing aralkyl hydrocarbyl sulfones. In addition, these novel compositions exhibit potent analgesic and antipyretic activity and, therefore, this invention also relates to analgesic and antipyretic methods and compositions. More particularly, this invention is concerned with the use of benzyl methyl sulfones as the active therapeutic ingredient in the herein described methods and compositions.

This invention also relates to certain novel substituted benzyl methyl sulfones of structural formula:

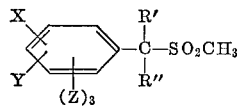

and processes for their preparation, wherein: R' and R" are hydrogen, lower alkyl, lower alkenyl, phenyl, or loweralkoxycarbonyl with the proviso that if R' and R" are the same they are hydrogen, lower alkyl, or phenyl and if they are different, one of the is hydrogen;

Z is hydrogen or fluorine;

X is hydrogen, hydroxyloweralkyl, aminoloweralkyl, diloweralkylaminoloweralkyl, haloloweralkyl such as trifluoromethyl lower alkoxy, phenyl, benzyloxy, fluoro, amino, diloweralkylamino, carboxy, loweralkoxycarbonyl; carbamoyl, N,N-diloweralkylcarbamoyl, or lower acyl; and Y is hydrogen, fluoro, amino, aminoloweralkyl, diloweralkylaminoloweralkyl, diloweralkylamino, carboxy, loweralkoxycarbonyl, carbamoyl, N,N-diloweralkylcarbamoyl, or loweracyl, with the proviso that if Z is fluorine X and Y are hydrogen or fluorine, and if Z is hydrogen and X and Y are both other than hydrogen they are both fluorine.

Benzyl methyl sulfone and the related aralkyl sulfones of this invention represent a new milestone in the continuing search for potent, low toxicity, anti-inflammatory agents. These sulfones provide a unique structure-activity relationship which not only has resulted in high anti-inflammatory, antipyretic, and analgesic potency, but also appear to exhibit a biological profile quite different from the salicylates and phenylbutazone.

It is an object of this invention to provide a method of treatment of inflammation and associated pain and fever in patients. It is also an object of this invention to provide analgesic and antipyretic methods for the relief and treatment of pain and fever not symptomatically related to an inflammatory indication. Another object is to provide an entirely new class of anti-inflammatory, analgesic and antipyretic compounds and compositions.

The above and other objects of this invention are accomplished by administration to a patient in dosage unit form, a pharmaceutically acceptable composition containing a therapeutically effective amount of an aralkyl sulfone, such as benzyl methyl sulfone. The sulfones of the novel compositions of this invention can be represented by the following formula:

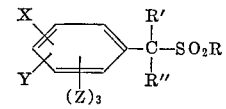

wherein R is alkyl of from 1 to about 20 carbon atoms, preferably lower alkyl of from 1 to about 8 carbons (such as methyl, propyl, pentyl and the like); cycloalkyl such as cyclohexyl and cyclopentyl, loweralkylcycloalkyl such as methylcyclohexyl, halocycloalkyl such as chlorocyclohexyl, lower alkenyl containing 1 or more double bonds and up to about 8 carbon atoms, haloloweralkyl and haloloweralkenyl bearing up to 3 halogens such as chlorine, bromine, and fluorine and up to about 8 carbons and hydroxyloweralkyl, hydroxyloweralkenyl, loweralkoxyloweralkyl and loweralkoxyloweralkenyl, each containing up to about 8 carbon atoms.

R' and R" are hydrogen, lower alkyl, lower alkenyl, phenyl, or loweralkoxycarbonyl with the proviso that if they are the same they are hydrogen, lower alkyl or phenyl and if they are different, one of them is hydrogen.

Z is hydrogen or fluorine. X is hydrogen, halo, nitro, amino, diloweralkylamino, lower alkyl, aminoloweralkyl, diloweralkylaminoloweralkyl, hydroxyloweralkyl, phenoxyloweralkyl, haloloweralkyl, lower alkoxy, phenyl, phenylloweralkoxy, or a radical of the formula —COA wherein A represents hydroxy, lower alkoxy, lower alkyl, amino, diloweralkylamino; and Y is hydrogen, halo, amino, diloweralkylamino, aminoloweralkyl, diloweralkylaminoloweralkyl, phenoxyloweralkyl or a radical of the formula —COA wherein A represents hydroxy, loweralkoxy, loweralkyl, amino or diloweralkylamino with the proviso that if Z is fluorine, X and Y are hydrogen or fluorine, and if X and Y are both other than hydrogen they are lower alkyl, halo, or nitro. Unless otherwise noted, lower alk- implies of from 1 to about 4 carbons.

A preferred embodiment of this invention is a method of treating a disease which is symptomatically characterized by pain, fever and/or inflammation which comprises the administration to a patient in dosage unit form of between about 0.01 and 5 gm. of benzyl methyl sulfone per day. On a kilogram basis, it is preferred to utilize between about 0.5 mg./kg. and 70 mg./kg. per day of the aralkyl hydrocarbyl sulfones of this invention.

Another embodiment of this invention is the provision of pharmaceutical compositions in dosage unit form which comprise from about 5 to 500 mg., and preferably from 25 to 250 mg., of an aralkyl hydrocarbyl sulfone of the above formula. Benzyl methyl sulfone, in oral dosage unit form, comprising about 25 to about 500 mg. is a preferred pharmaceutical composition of this invention.

The aralkyl hydrocarbyl sulfone active ingredient of the compositions of this invention demonstrates significant anti-inflammatory analgesic and antipyretic properties. For example, anti-inflammatory activity of a high order of potency was shown for benzyl methyl sulfone against carrageenan edema, using the method set forth in Proc. Soc. Exp. Biol. Med. 3: 544 (1962). The minimum dose required for dependable demonstration of anti-inflammatory activity was about 1 mg./kg. This compound is also a potent analgesic, as has been shown by antinociceptive testing by the inflamed foot technique of Randall & Selitto, Arch. Int. Parmacodyn. 11: 409 (1957), as modified by Gilfoil et al. (1963) and Winter et al. (1965). Benzyl methyl sulfone raised the pain threshold most significantly when compared to the controls treated with the corresponding vehicle exclusive of said sulfone. Significant activity was observed at dosages as low as 3.33 mg./kg. and high potency was observed at 30 mg./kg. and 90 mg./kg. It is significant to note that the pain threshold was raised in both the infected and noninfected foot. This is in contrast to currently used analgesics which raise the pain threshold in the infected foot only.

An analgesic effect was also demonstrated in treatment of arthritis induced hyperesthesia, utilizing a promising extremely sensitive technique which quantitatively records vocalization reduction. According to this test, benzyl methyl sulfone is a potent analgesic at dosages as low as .33 and 1 mg./kg. In addition, the sulfones of this invention, as exemplified by benzyl methyl sulfone, exhibit potent antipyretic activity in yeast induced fever tests. Benzyl methyl sulfone was demonstrated to have antipyretic activity at dosages as low as 12.5 mg./kg. Similarly anti-inflammatory, analgesic and antipyretic activity can be demonstrated for other active sulfone ingredients of this invention, e.g. benzyl ethyl sulfone, benzyl propyl sulfone, benzyl butyl sulfone, benzyl t-butyl sulfone, benzyl cyclohexyl sulfone, benzyl vinyl sulfone, benzyl 2-hydroxyethyl sulfone, o-methylbenzyl methyl sulfone and o-chlorobenzyl methyl sulfone.

Thus it can be seen that the novel sulfone compositions of this invention exercise anti-inflammatory, analgesic and antipyretic activity.

Such pharmaceutical compositions may be in a form suitable for oral use, for example, as tablets, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide a pharmaceutically elegant and palatable preparation. Tablets contain the active sulfone ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and distintegrating agents, for example maize starch, or alginic acid; binding agents, for example, starch, gelatine or acacia, and lubricating agents, for example, magnesium stearate, stearic acid or talc. The tablets may be uncoated or they may be coated by known techniques to delay disintegration and absorption in the gastrointestinal tract and thereby provide a sustained action over a longer period.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with an oil medium, for example arachis oil, liquid paraffin or olive oil.

Aqueous suspensions contain the active aralkyl hydrocarbyl sulfones in admixture with excipients suitable for the manufacture of aqueous suspensions. Such excipients are suspending agents, for example sodium carboxymethyl-cellulose, methylcellulose, hydroxypropylmethylcellulose, sodium alginate, polyvinylpyrrolidone, gum tragacanth and gum acacia; dispersing or wetting agents may be naturally-occurring phosphatide, for example lecithin, or condensation products of an alkylene oxide with fatty acids, for example, polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example, ethyl, or n-propyl, p-hydroxy benzoate, one or more colouring agents, one or more flavoring agents and one or more sweetening agents, such as sucrose, saccharin, or sodium or calcium cyclamate.

Oily suspensions may be formulated by suspending the active ingredient in a vegetable oil, for example, arachis oil, olive oil, sesame oil or coconut oil, or in a mineral oil such as liquid paraffin. The oily suspensions may contain a thickening agent, for example, beeswax, hard paraffin or cetyl alcohol. Sweetening agents, such as those set forth above and flavouring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavouring and colouring agents, may also be present.

The pharmaceutical compositions of the invention may also be in the form of oil-in-water emulsions. The oily phase may be a vegetable oil, for example, olive oil or arachis oils, or a mineral oil for example, liquid paraffin or mixtures of these. Suitable emulsifying agents may be naturally-occurring gums, for example gum acacia or gum tragacanth, naturally-occurring phosphatides, for example, soya bean lecithin, and esters of partial esters derived from fatty acids and hexitol anhydrides, for example, sorbitan mono-oleate, and condensation products of the said partial esters with ethylene oxide, for example, polyoxyethylene sorbitan mono-oleate. The emulsions may also contain sweetening and flavouring agents.

Syrups and elixirs may be formulated with sweetening agents, for example glycerol, sorbitol or sucrose. Such formulations may also contain a demulcent, a preservative and flavouring and colouring agents. The pharmaceutical compositions may be in the form of a sterile injectable preparation, for example, as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol.

The sulfone compositions of this invention may also be in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion it is apparent that the compositions of this invention can be administered orally, parenterally, topically and rectally. The term parenteral as used herein includes subcutaneous injection, intravenous, intramuscular, or intrasternal injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of inflammation, pain and fever. In general, the daily dose can be between about 0.5 mg./kg. and 70 mg./kg., bearing in mind of course that in selecting the appropriate dosage in any specific case, consideration must be given to the patient's weight, general health, age and other factors which may influence response to the drug.

It is expected that the sulfone compositions of this invention will generally be administered in dosage units of between 5 and 500 mg. of active ingredient. Preferred compositions for ease of administration are in oral dosage unit form, e.g. tablets or capsules, containing between 25 and 500 mg. of a sulfone of this invention.

This invention is further demonstrated by the following examples in which all parts are by weight.

EXAMPLE 1

A mixture of 250 parts of benzyl methyl sulfone and 25 parts of lactose is granulated with suitable water, and to this is added 100 parts of maize starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The benzyl methyl sulfone used in the foregoing example may be replaced by 25, 100 or 500 parts of benzyl methyl sulfone, benzyl propyl sulfone, benzyl isopropyl sulfone, benzyl 2-methyl butyl sulfone, benzyl isobutyl sulfone, benzyl t-butyl sulfone, benzyl 1,1,3,3-tetramethylbutyl sulfone, benzyl propenyl sulfone, benzyl 2-methylallyl sulfone, benzyl 3-ethoxypropyl sulfone, p-methylbenzyl ethyl sulfone, p-bromobenzyl allyl sulfone, benzyl cyclohexyl sulfone and the like sulfones of this invention to produce tablets suitable for oral administration as an anti-inflammatory, anti-pyretic and/or analgesic according to the method of this invention.

EXAMPLE 2

A mixture of 50 parts of benzyl ethyl sulfone, 3 parts of the calcium salt of lignin sulphonic acid, and 237 parts of water is ball-milled until the size of substantially all of the particles of benzyl ethyl sulfone is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 3

A mixture of 250 parts of benzyl butyl sulfone, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 4

A mixture of 500 parts o-chlorobenzyl methyl sulfone, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 5

A mixture of 25 parts of benzyl allyl sulfone, 30 parts of sucrose, 0.5 part of acetyl alcohol polyethylene oxide condensate, 1 part of polyvinyl pyrrolidone, 0.25 part of methyl p-hydroxybenzoate and 100 parts of water is ball-milled for several hours. After the incorporation of suitable colouring and flavouring agents, there is obtained an aqueous suspension suitable for oral administration for therapeutic purposes.

EXAMPLE 6

5 parts of benzyl 2-methylcyclohexyl sulfone in a finely divided form are mixed with 12 parts of powdered gum acacia, 0.8 part of powdered tragacanth and 0.4 part of elixir of saccharin, and the whole is mixed with 50 parts of arachis oil. The oily suspension is then mixed with 50 parts water and there is thus obtained an emulsion suitable for oral administration.

Further illustrative of the active sulfone ingredients of this invention, and utilizable in the formulations described in Examples 1 through 6 are: benzyl pentyl sulfone, benzyl isopentyl sulfone, benzyl 2-methyl cyclopentyl sulfone, benzyl 2-butenyl sulfone, benzyl 3-butenyl sulfone, benzyl 1-methyl allyl sulfone, benzyl 2-methyl allyl sulfone, benzyl 1-methylpropenyl sulfone, benzyl 2-methylpropenyl sulfone, benzyl vinyl sulfone, benzyl 2-bromoethyl sulfone, benzyl 2-chloroethyl sulfone, benzyl 2-chloropropyl sulfone, benzyl 3-chloropropyl sulfone, benzyl 2-chlorocyclohexyl sulfone, benzyl 2,3-dichloropropyl sulfone, benzyl 2,3-dibromopropyl sulfone, benzyl 2,3,3-trichloropropyl sulfone, benzyl 2-ethoxyethyl sulfone, benzyl 1,2-dichlorovinyl sulfone, benzyl 1,2,2-trichlorovinyl sulfone, benzyl 3-bromoallyl sulfone, benzyl 3-bromopropenyl sulfone, benzyl 3-chloropropenyl sulfone, benzyl, 3,3-dichloroallyl sulfone, α-methylbenzyl methyl sulfone, m-chlorobenzyl methyl sulfone, p-chlorobenzyl methyl sulfone, 3,4-dimethylbenzyl ethyl sulfone, 3,4-dimethylbenzyl methyl sulfone, 3,4-dichlorobenzyl methyl sulfone, 3,4-dichlorobenzyl ethyl sulfone, o-methylbenzyl allyl sulfone, p-methylbenzyl allyl sulfone, m-methylbenzyl allyl sulfone, m-nitrobenzyl allyl sulfone, p-nitrobenzyl allyl sulfone, m-nitrobenzyl allyl sulfone, p-chlorobenzyl 2-chloroethyl sulfone, p-chlorobenzyl 1,2-dichlorovinyl sulfone, α,α-dimethylbenzyl isobutyl sulfone, α-ethylbenzyl methyl sulfone, α-allylbenzyl methyl sulfone, α-phenylbenzyl methyl sulfone, α-ethoxycarbonylbenzyl methyl sulfone, α,α-diphenylbenzyl methyl sulfone, 2,4-difluoro-α,α-dimethylbenzyl methyl sulfone, 3-tertiarybutylbenzyl methyl sulfone, 2-hydroxymethylbenzyl methyl sulfone, 2-aminomethylbenzyl methyl sulfone, 2-dimethylaminomethylbenzyl methyl sulfone, 3-trifluoromethylbenzyl methyl sulfone, 4-methoxybenzyl methyl sulfone, 2-methoxybenzylmethyl sulfone, 3-methoxybenzyl methyl sulfone, 4-phenylbenzyl methyl sulfone, 4-benzyloxybenzyl methyl sulfone, 2-benzyloxybenzyl methyl sulfone, 2-, 3-, and 4-fluorobenzyl methyl sulfone, 2-bromobenzyl methyl sulfone, 2-nitrobenzyl methyl sulfone, 2-, and 4-aminobenzyl methyl sulfone, 2-dimethylaminobenzyl methyl sulfone, 2-carboxybenzyl methyl sulfone, 2-methoxycarbonylbenzyl methyl sulfone, 2-carbamoylbenzyl methyl sulfone, 2-N,N-dimethylcarbamoylbenzyl methyl sulfone, 2-acetylbenzyl methyl sulfone, 2,4-dichlorobenzyl methyl sulfone, 3,4-dichlorobenzyl methyl sulfone, 2,6-dichlorobenzyl methyl sulfone and 3,5-dichlorobenzyl methyl sulfone.

The aralkyl hydrocarbyl sulfones of this invention are produced by well known techniques such as oxidation of the corresponding sulfide with dilute hydrogen peroxide, or permanganate and glacial acetic acid, and heating; alkylation of the corresponding sulfinate. These methods are more fully set forth in Synthetic Organic Chemistry, John Wiley & Sons, Inc., New York, pages 801–803 (1953), and the following descriptions and examples.

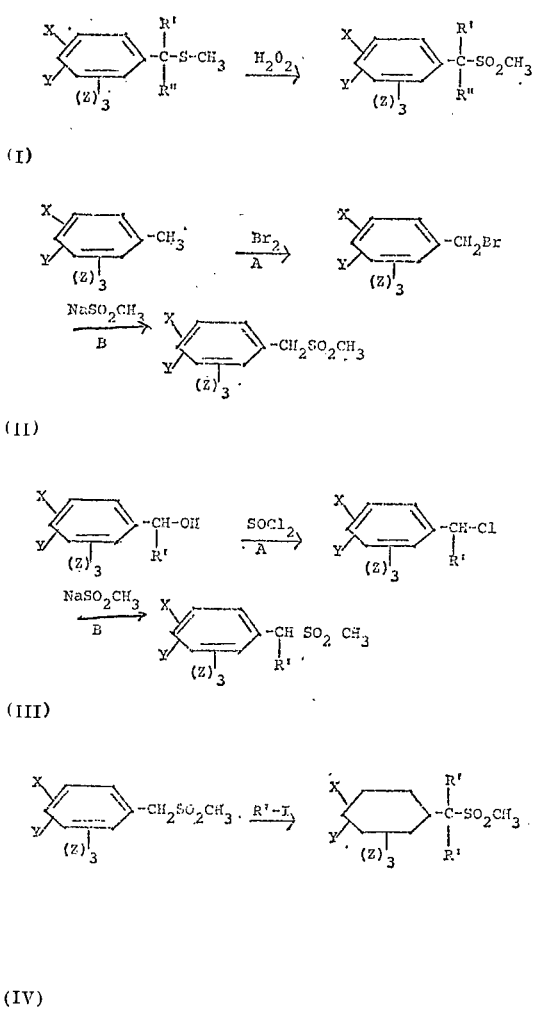

Reaction II–A is normally conducted by adding a carbon tetrachloride solution of bromine to a carbon tetrachloride solution of the appropriate toluene under reflux and the influence of ultraviolet irradiation. Other halogenated hydrocarbons such as chloroform, tetrachloroethylene and the like can be used equally well at any reasonable temperature, reflux being most convenient.

Reaction III–A is normally conducted by treating a benzene solution of a benzyl alcohol with thionyl chloride at reflux temperature for about one hour. This can also be performed in other inert solvents such as toluene, chloroform, tetrachloride and the like or by using excess thionyl chloride as solvent. Any temperature from about 50 to 150° C. is satisfactory, but again reflux temperature is most convenient.

Reactions II–B and III–B are identical and are normally conducted by refluxing an alcoholic solution of equimolar amounts of the benzyl halide and sodium methyl sulfinate monohydrate for about 2 hours, followed by cooling which usually results in crystallization of the product. Alcohols such as methanol, ethanol, propanol, and the like are satisfactory solvents. Heating for 2 hours is usually sufficient, but extended reaction times can be conveniently used.

Reaction IV is usually performed by treating a benzyl sulfone with sodium hydride in dimethyl formamide, warming to 50–60° C. for a short time and then adding an iodohydrocarbon to the chilled mixture with stirring. The product is conveniently isolated by pouring onto ice and extracting it with ether. Other solvents utilizable in this reaction are tetramethyl urea, glycine, diglycine and the like.

EXAMPLE 7

2-N,N-dimethylcarbamoylbenzyl methyl sulfone (A) 2-carboxybenzyl methyl sulfone.—To a suspension of 7 g. of 2-carboxybenzyl methyl sulfide in 50 ml. of glacial acetic acid there is added portionwise with stirring 9 ml. of 30% hydrogen peroxide while controlling the temperature near 20° with an ice bath. The mixture is then stirred at room temperature for 2 hours and on a steam bath for 1 hour. The mixture is poured into 500 ml. water and is extracted 3 times with 75 ml. methylene chloride. After drying over anhydrous magnesium sulfate, the extract is diluted to 1 litre with petroleum-ether to give 3.4 g. of product, M.P. 165–166° C. The crude product is recrystallized from petroleum-ether/acetone to give 2.11 g., M.P. 164–165° C.

*Analysis.*—Calculated for $C_9H_{10}O_4S$ (percent): C, 50.47; H, 4.71; S, 14.94. Found (percent): C, 50.68; H, 4.87; S, 15.53.

(B) 2-N,N-dimethylcarbamoylbenzyl methyl sulfone.— 2-carboxybenzyl methyl sulfone (1.0 g.) and 5 ml. of thionyl chloride are refluxed with stirring for one-half hour. The excess thionyl chloride is evaporated under reduced pressure. The residue is dissolved in methylenechloride and the solvent is evaporated to dryness. The residual 2-chlorocarbonylbenzyl methyl sulfone is dried in vacuo over potassium hydroxide.

The acid chloride is dissolved in 30 ml. of methylenechloride and gaseous anhydrous dimethylamine is added until the solution is definitely basic. The mixture is concentrated to dryness under reduced pressure. The residual oil is coevaporated twice with water in vacuo. Water is added and the product is extracted three times with methylenechloride. The extract is dried over magnesium sulfate and concentrated in vacuo to a colorless oil which crystallizes slowly. The product was recrystallized from a mixture of 10 ml. methylenechloride and 70 ml. of petroleum ether to give 0.9 g., M.P. 117–118° C., of 2-N,N-dimethylcarbamoylbenzyl methyl sulfone.

*Analysis.*—Calculated for $C_{11}H_{15}O_3NS$ (percent): C, 54.78; H, 6.27; S, 13.29. Found (percent): C, 54.23; H, 5.83; S, 13.26.

EXAMPLE 8

2-benzyloxybenzyl methyl sulfone (A) 2-benzyloxybenzylchloride.—To a solution of 40 g. of 2-benzyloxybenzyl alcohol in 400 ml. of dry benzene and 3 drops of dry pyridine is added 20.4 ml. of thionyl chloride and the solution is refluxed with stirring for 1 hour. The solution is cooled, washed 12 times with 500 ml. of cold water and is dried over anhydrous magnesium sulfate. The solvent is evaporated in vacuo to a colorless oil weighing 44.3 g.

(B) 2-benzyloxybenzyl methyl sulfone.—A solution of 11.63 g. of 2-benzyloxybenzylchloride and 6 g. of sodium methylsulfinante monohydrate in 100 ml. of absolute alcohol is refluxed with stirring for 2 hours. The mixture is cooled, filtered and evaporated in vacuo to a crystalline residue. The crystals are collected by filtration after slurrying in water, washed with water, air-dried and recrystallized from 65 ml. of methanol to give 8.43 g., M.P. 117–119° C.

*Analysis.*—Calculated for $C_{15}H_{16}O_3S$ (percent): C, 65.19; H, 5.87; S, 11.60. Found (percent): C, 65.70; H, 5.58; S, 11.96.

Employing the methods disclosed in Example 8, but substituting for 2-benzyloxybenzyl alcohol an equimolar amount of the substituted benzyl alcohols in Table I, there is obtained the tabulated products.

TABLE I

| Starting material | Product | M.P. (° C.) |
| --- | --- | --- |
| 4-phenylbenzyl alcohol | 4-phenylbenzyl methyl sulfone. | 224–5 |
| 4-methoxybenzyl alcohol | 4-methoxybenzyl methyl sulfone. | 110–12 |
| 2-methoxybenzyl alcohol | 2-methoxybenzyl methyl sulfone. | 94–96 |
| α-Phenylbenzyl alcohol | α-Phenylbenzyl methyl sulfone. | 133–5 |
| 3-methoxybenzyl alcohol | 3-methoxybenzyl methyl sulfone. | 44–5 |
| 4-benzyloxybenzyl alcohol | 4-benzyloxybenzyl methyl sulfone. | 174–5 |
| α-Ethylbenzyl alcohol | α-Ethylbenzyl methyl sulfone. | 79.0–79.5 |

EXAMPLE 9

2,4-difluorobenzyl methyl sulfone (A) 2,4-difluorobenzylbromide.—A solution of 25.3 g. of 2,4-difluorotoluene in 200 ml. of dry carbon tetrachloride is heated, with stirring to reflux while adding 27 g. of bromine in 50 ml. of carbon tetrachloride is added dropwise under ultraviolet irradiation. After the bromine color disappears (about ½ hour), the solution was cooled, washed with ice water, dried over magnesium sulfate and concentrated to dryness in vacuo to yield 37.1 g. of 2,4-difluorobenzylbromide.

(B) 2,4-difluorobenzyl methyl sulfone.—Prepared from 8.6 g. 2,4-difluorobenzylbromide and 5.0 g. sodium methyl sulfinate monohydrate as described in Example 8 B to give 2.8 g. 2,4-difluorobenzyl methyl sulfone, M.P. 94–95° C.

Analysis.—Calculated for $C_8H_8F_2O_2S$ (percent): C, 46.60; H, 3.91. Found (percent): C, 46.92; H, 3.82.

Employing the methods disclosed in Example 9, but substituting for 2,4-difluorotoluene, an equimolar amount of the substituted benzyl alcohols in Table II, there is obtained the tabulated products.

TABLE II

| Starting material | Product | M.P. (° C.) |
| --- | --- | --- |
| 2-fluorotoluene | 2-fluorobenzyl methyl sulfone | 90–92 |
| 4-fluorotoluene | 4-fluorobenzyl methyl sulfone | 107–110 |
| 3-fluorotoluene | 3-fluorobenzyl methyl sulfone | 100–103 |
| 2,4-dichlorotoluene | 2,4-dichlorobenzyl methyl sulfone. | 112–15 |
| 3-trifluoromethyltoluene | 3-trifluoromethylbenzyl methyl sulfone. | 111–12 |
| 3,4-dichlorotoluene | 3,4-dichlorobenzyl methyl sulfone. | 132–3 |
| 2,6-dichlorotoluene | 2,6-dichlorobenzyl methyl sulfone. | 109–10 |
| 2-bromotoluene | 2-bromobenzyl methyl sulfone. | 85–7 |
| 3,5-dichlorotoluene | 3,5-dichlorobenzyl methyl sulfone. | 126–7 |
| Pentafluorotoluene | Pentafluorobenzyl methyl sulfone. | 129–30 |
| 2-fluoro-4-chlorotoluene | 2-fluoro-4-chlorobenzyl methyl sulfone. | 101–2 |
| 2,5-difluorotoluene | 2,5-difluorobenzyl methyl sulfone. | 92–4 |
| 3-tertiarybutyltoluene | 3-tertiarybutylbenzyl methyl sulfone. | 118–19 |
| o-Tolunitrile | 2-cyanobenzyl methyl sulfone. | 133–34 |

EXAMPLE 10

α,α-Dimethyl-2,4-difluorobenzyl methyl sulfone 2,4-difluorobenzyl methyl sulfone (3.0 g.) is suspended in 30 ml. of dry dimethylformamide and 1.7 g. (0.034 mole) of sodium hydride emulsion is added with stirring. The mixture is warmed at 50–60° C. for 20 minutes when gas evolution ceases. Methyl iodide (5.0 ml.) in 5.0 ml. dimethylformamide is added to the chilled mixture dropwise with swirling and the mixture is stirred in ice for 5 hours, and overnight at room temperature. The mixture is poured into cold water, and extracted with ether. The extract is washed with water, dried over sodium sulfate, and concentrated to a yellow oil (2.5 g.). The oil is chromatographed on 180 g. of silica gel, eluting as follows:

7× 250 ml. portions of petroleum ether,
2× 250 ml. portions of 5% benzene petroleum ether,
4× 250 ml. portions of 10% benzene petroleum ether,
2× 250 ml. portions of 50% benzene petroleum ether,
2× 250 ml. portion of benzene,
2× 250 ml. portions of 10% ethyl acetate and
2× 250 ml. portions of 20% ethyl acetate-benzene.

The last two fractions containing 2.0 g. of a mixture is distilled in vacuo at a bath temperature of 115–150° C. to give 0.7 g. of oily α,α-dimethyl-2,4-difluorobenzyl methyl sulfone.

Analysis.—Calculated for $C_{11}H_{14}C_4S$ (percent): C, 51.24; H, 5.16; S, 13.69. Found (percent): C, 50.54; H, 5.01; S, 13.64.

EXAMPLE 11

α-Ethoxycarbonylbenzyl methyl sulfone (A) Ethyl α-bromophenylacetate.—A solution of 9.45 g. of α-bromophenylacetic acid in 200 ml. of absolute alcohol is saturated with hydrogen chloride and stored at 20–25° for 3 days. The solution is evaporated to a small volume and then distributed between ether and ice water. Excess sodium bicarbonate is added, the ether layer is separated, dried over anhydrous sodium sulphate and evaporated in vacuo to give 8.97 g. of oily ethyl α-bromophenylacetate.

(B) α-Ethoxycarbonylbenzyl methyl sulfone.—A mixture of 8.97 g. of ethyl α-bromophenylacetate, 8.9 g. of sodium methyl sulfinate and 50 ml. of absolute alcohol is refluxed 16 hours. The solvent is evaporated in vacuo and the residue is distributed between chloroform and water. The chloroform layer is separated and the solvent is evaporated in vacuo to leave the product.

Analysis.—Calculated for $C_{11}H_{14}C_4S$ (percent): C, 54.54; H, 5.83; S,13.23. Found (percent): C, 54.50; H, 5.87; S, 13.49.

EXAMPLE 12

2-nitrobenzyl methyl sulfone.—A solution of 10.8 g. (0.05 mole) of 2-nitrobenzyl bromide and 6.0 g. (0.05 mole) of sodium methyl sulfinate monohydrate in 100 ml. of absolute alcohol is refluxed 2 hours. The solution is cooled, evaporated in vacuo and the residue is slurried in water. The crystals are collected and recrystallized from 125 ml. absolute alcohol to give 6.47 g., M.P. 115–116°.

Analysis.—Calculated for $C_8H_9NO_4S$ (percent): C, 44.64; H, 4.22; S, 14.90. Found (percent): C, 44.50; H, 4.20; S, 15.52.

EXAMPLE 13

2-dimethylaminobenzyl methyl sulfone.—A solution of 1.0 g. (0.0046 mole) of 2-nitrobenzyl methyl sulfone and 1.6 ml. of 37% formaldehyde in 50 ml. methanol is hydrogenated over 0.5 g. of 5% palladium on charcoal under 42 lbs. of hydrogen pressure until 5 equivalents of hydrogen are absorbed. The catalyst is filtered off and the filtrate is evaporated in vacuo. The oily residue is dissolved in absolute alcohol, treated with hydrogen chloride gas and then evaporated to dryness whereupon it crystallizes. The material is recrystallized twice from alcohol to give 0.87 g., M.P. 175–190° C.

Analysis.—Calculated for $C_{10}H_{15}NO_2SHCl$ (percent): C, 48.08; H, 6.46; S, 12.84. Found (percent): C, 47.86; H, 6.26; S, 12.59.

EXAMPLE 14

4-aminobenzyl methyl sulfone.—A solution of 3.0 g. of 4-nitrobenzyl methyl sulfone in methanol-acetic acid is hydrogenated over Raney nickel. The catalyst is filtered off and the filtrate is concentrated to dryness. The solid residue is crystallized from 75 ml. methanol to give 1.07 g., M.P. 169–171° C.

Analysis.—Calculated for $C_8H_{11}NO_2S$ (percent): C, 51.88; H, 5.99. Found (percent): C, 52.09; H, 5.85.

EXAMPLE 15

α,α-Dimethylbenzyl methyl sulfone.—Employing the method of Example 10 with 5.5 g. of α-methylbenzyl methyl sulfone, 50 ml. dimethyl formamide and 1.44 g. of a 50% sodium hydride emulsion, there is obtained 1.5 g. of α,α-dimethylbenzyl methyl sulfone, M.P. 83–85° C.

Analysis.—Calculated for $C_{10}H_{15}NO_2S \cdot HCl$ (percent): 60.59; H, 7.12. Found (percent): C, 60.27; H, 6.90.

EXAMPLE 16

α-Allylbenzyl methyl sulfone.—A solution of 9.5 g. (50 mm.) of benzyl methyl sulfone and 3.83 g. (50 mm.) of allyl chloride in dimethyl formamide is added with stirring to a suspension of 3.4 g. (70 mm.) of a 53% sodium hydride emulsion in 150 ml. dimethyl formamide. The mixture is heated 1 hour at 100° C., cooled to 23° C., and treated with 5 g. (0.1 mole) of ammonium chloride. The mixture is diluted with 2 litres of water and extracted with methylene chloride to give 11.2 g. of oil. The oil is chromatographed on silica gel column 3.2 cm. x 90 cm. with a methylene chloride-methanol (99:1) mixture, one litre fractions being collected. Fractions 5 and 6 are combined and concentrated to give 7.3 g. of oil which crystallizes. The product is recrystallized from ether-petroleum ether to give 3.2 g. of α-allylbenzyl methyl sulfone, M.P. 48–49° C.

Analysis.—Calculated for $C_{11}H_{14}O_2S$ (percent): C, 62.84; H, 6.71; S, 15.22. Found (percent): C, 62.72; H, 6.49; S, 15.33.

EXAMPLE 17

2-methoxycarbonylbenzyl methyl sulfone.—A solution of 1 g. of 2-chlorocarbonylbenzyl methyl sulfone (see Example 7, Steps A and B) in 50 ml. of methanol is refluxed 1.5 hours, and concentrated to dryness in vacuo. The residue is dissolved in methylene chloride, washed with dilute sodium bicarbonate solution and water, dried over anhydrous magnesium sulfate and concentrated to dryness to give 0.55 g. crystals which after two recrystallizations from methylene chloride-petroleum ether solution has M.P. 89–90° C.

Analysis.—Calculated for $C_{10}H_{12}O_4S$ (percent): C, 52.62; H, 5.30; S, 14.05. Found (percent): C, 52.26; H, 5.19; S, 14.29

EXAMPLE 18

2-carbamoylbenyl methyl sulfone.—Gaseous ammonia is added to a solution of 1 g. 2-chlorocarbonylbenzyl methyl sulfone (see Example 7) in 30 ml. of methylene chloride. The colorless crystals that separate are collected and washed with water. The solids are recrystallized twice from methanol to give 0.54 g., M.P. 215–216° C.

Analysis.—Calculated for $C_9H_{11}O_3NS$ (percent): C, 50.69; H, 5.20; S, 15.03. Found (percent): C, 50.74; H, 5.23; S, 14.70.

EXAMPLE 19

2-aminomethylbenzyl methyl sulfone hydrochloride.— A mixture of 1 g. (0.005 mole of 2-cyanobenzyl methyl sulfone (see Example 9), 10 ml. of ethanol, 5 ml. of liquid ammonia and ½ teaspoon of Raney nickel is treated for 3 hours at 75°, under 1500 p.s.i. of hydrogen pressure. The mixture is diluted with 200 ml. of ethanol, filtered, and concentrated in vacuo to 1.3 g. solid. The solid is treated with dilute hydrochloric acid and concentrated to dryness to give 1.4 g. solid. This hydrochloride is dissolved in water treated with alkali, and the free base is extracted out with methylene chloride. The dried solution is treated with dry hydrogen chloride and concentrated to dryness to give 0.54 g. of residue which is recrystallized from absolute alcohol to give 0.37 g., M.P. 205–207° C.

Analysis.—Calculated for $C_9H_{13}NO_2S \cdot HCl$ (percent): C, 45.86; H, 5.94; S, 13.56. Found (percent): C, 45.99; H, 5.74; S, 13.51.

EXAMPLE 20

2-dimethylaminomethylbenzyl methyl sulfone.—Employing the method of Example 13 but utilizing 1.46 g. (0.0062 mole) of 2-aminomethylbenzyl methyl sulfone hydrochloride, 10 ml. of water and 200 ml. of 37% formaldehyde, there is prepared 1.15 g. of 2-dimethyl-aminomethylbenzyl methyl sulfone, M.P. 232–234° C.

Analysis.—Calculated for $C_{11}H_{17}NO_2S \cdot HCl$ (percent): C, 50.08; H, 6.88; S, 12.15. Found (percent): C, 50.45; H, 6.90; S, 13.94.

EXAMPLE 21

2-aminobenzyl methyl sulfone hydrochloride.—A mixture of 2.0 g. (0.0092 mole) of 2-nitrobenzyl methyl sulfone (Example 12), 75 ml. of methanol and 0.4 g. of 5% palladium on charcoal catalyst is shaken under 40 lbs. of hydrogen pressure until three equivalents of hydrogen are absorbed. The mixture is filtered and the filtrate is concentrated in vacuo to 1.7 g. of solid. One gram of the solid is dissolved in absolute alcohol, treated with dry hydrogen chloride and concentrated in vacuo to 1.3 g. of a crystalline residue which after crystallizing from ethanol has M.P. 185–195° C.

Analysis.—Calculated for $C_8H_{11}NO_2S \cdot HCl$ (percent): C, 43.34; H, 5.47; S, 14.46. Found (percent): C, 43.18; H, 5.24; S, 13.81.

EXAMPLE 22

2-hydroxymethylbenzyl methyl sulfone.—A solution of 1.77 g. (0.007 mole) of 2-methoxy-carbonylbenzyl methyl sulfone in 100 ml. ether and 50 ml. tetrahydrofuran is added dropwise to a stirred mixture of 0.5 g. lithium aluminum hydride in ether. After stirring 45 minutes there is added 3 ml. of ethyl acetate in 15 ml. of ether, then 3 ml. of methanol in 15 ml. of ether and finally 15 ml. of a saturated solution of sodium sulfate. The mixture is filtered, dried over magnesium sulfate and concentrated in vacuo to 1.8 g. of oil. The oil is purified by chromatography on 40 g. silica gel with methylene chloride as solvent. The product is collected and recrystallized from methylene chloride-petroleum ether to give 0.47 g., M.P. 75–77° C.

Analysis.—Calculated for $C_9H_{12}O_3S$ (percent): C, 53.98; H, 6.04; S, 16.01. Found (percent): C, 53.73; H, 5.96; S, 16.71.

EXAMPLE 23

2-acetylbenzyl methyl sulfone.— A Grignard reagent prepared from 0.8 g. (0.034 mole) of magnesium and 4.8 g. (0.034 mole) of methyl iodide in ether is treated with 3.5 g. (0.019 mole) of cadmium chloride and refluxed 1 hour. The solution is cooled and 3.64 g. of 2-chlorocarbonylbenzyl methyl sulfone in 40 ml. benzene is added dropwise and the mixture is stirred and refluxed 2 hours. The mixture is poured onto ice in 40 ml. of 2.5 N hydrochloric acid. The organic phase is separated by extraction with benzene-ether, dried and concentrated in vacuo to 3.3 g. oil. After purifying by chromatography on silica gel with methylene chloride and finally crystallizing from ether-petroleum ether there is obtained 0.13 g., M.P. 68–70° C.

Analysis.—Calculated for $C_{10}H_{12}O_3S$ (percent): C, 56.58; H, 5.70; S, 15.10. Found (percent): C, 56.56. H, 5.91; S, 15.31.

What is claimed is:

1. A compound of the formula

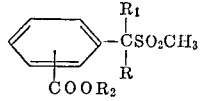

wherein R and $R_1$ each may be hydrogen or loweralkyl, and $R_2$ is loweralkyl.

(References on following page)

References Cited

UNITED STATES PATENTS 3,105,090  9/1963  Leonard _____ 260—470 X

OTHER REFERENCES

Roberts and Caserio, "Basic Principles of Organic Chemistry," W. A. Benjamin, Inc., (1965) p. 345.

LORRAINE A. WEINBERGER, Primary Examiner

J. F. TERAPANE, Assistant Examiner

U.S. Cl. X.R.

260—607 A, 470, 575, 576, 577, 571, 574, 515 M, 520, 521 R, 521 A, 592, 558 S, 559 T, 570.8 R, 570.9, 578, 651 R, 612 R, 612 D, 465 R, 650, 646, 618, 473 R; 424—308, 324, 330, 331, 337; 204—163